(12) United States Patent  
Haigh et al.

(10) Patent No.: US 7,140,959 B2
(45) Date of Patent: Nov. 28, 2006

(54) VENT ASSEMBLY WITH SINGLE PIECE COVER

(75) Inventors: James A. Haigh, Shelby Township, MI (US); Richard J. Iminski, St. Clair Shores, MI (US); Philip K. Truscott, Metamora, MI (US)

(73) Assignee: Transpec, Inc., Sterling Heights, MI (US)

( * ) Notice: Subject to any disclaimer, the term of this patent is extended or adjusted under 35 U.S.C. 154(b) by 0 days.

(21) Appl. No.: 10/978,631

(22) Filed: Nov. 1, 2004

(65) Prior Publication Data

US 2005/0095973 A1    May 5, 2005

Related U.S. Application Data

(63) Continuation-in-part of application No. 10/503,190, filed as application No. PCT/US03/019417 on Jun. 20, 2003.

(60) Provisional application No. 60/390,375, filed on Jun. 21, 2002.

(51) Int. Cl.
    *B60J 7/11* (2006.01)
(52) U.S. Cl. ...................... 454/136; 454/117
(58) Field of Classification Search ............... 454/82, 454/115, 117, 136, 137, 162
    See application file for complete search history.

(56) References Cited

U.S. PATENT DOCUMENTS 1,969,935 A * 8/1934 Lintern et al. .............. 454/138
1,983,979 A * 12/1934 Graham ...................... 454/117
2,210,592 A * 8/1940 Lintern et al. .............. 454/136
2,550,353 A * 4/1951 Hopfinger ................... 454/136
4,433,506 A   2/1984 Manning
4,592,269 A   6/1986 Lamparter
4,895,065 A   1/1990 Lamparter
4,964,673 A  10/1990 Lamparter
5,344,361 A * 9/1994 Matthias .................... 454/129
6,572,182 B1  6/2003 Lamparter et al.

* cited by examiner

*Primary Examiner*—Gregory Wilson
(74) *Attorney, Agent, or Firm*—Reising, Ethington, Barnes, Kisselle, P.C.

(57) ABSTRACT

A vent assembly has a base and a single piece cover that is attached to the base to form a housing. A partition inside the housing forms an upper compartment that communicates with an outlet at the rear of the cover and a lower compartment that communicates with an inlet through the base. The compartments communicate via an opening through the partition. The partition provides an exhaust passage from the opening to the outlet at the rear of the cover that has several barriers including dams inhibiting the flow of water from the outlet back to the opening. The partition and cover also provide a drain passage connected to the exhaust passage by several cross passages to drain water accumulated in the exhaust passage. The vent assembly may have two exhaust passages interconnected by a transverse drainage passage and associated with respective drainage passages. The vent assembly may be static or include a fan unit to provide a powered vent assembly. Either may be used as the hatch of a combined vent and escape hatch assembly. In the later case, the cover may be shaped to accommodate an exterior handle and provide drainage to prevent the accumulation of water and formation of ice that could inhibit operation of the exterior handle.

20 Claims, 8 Drawing Sheets

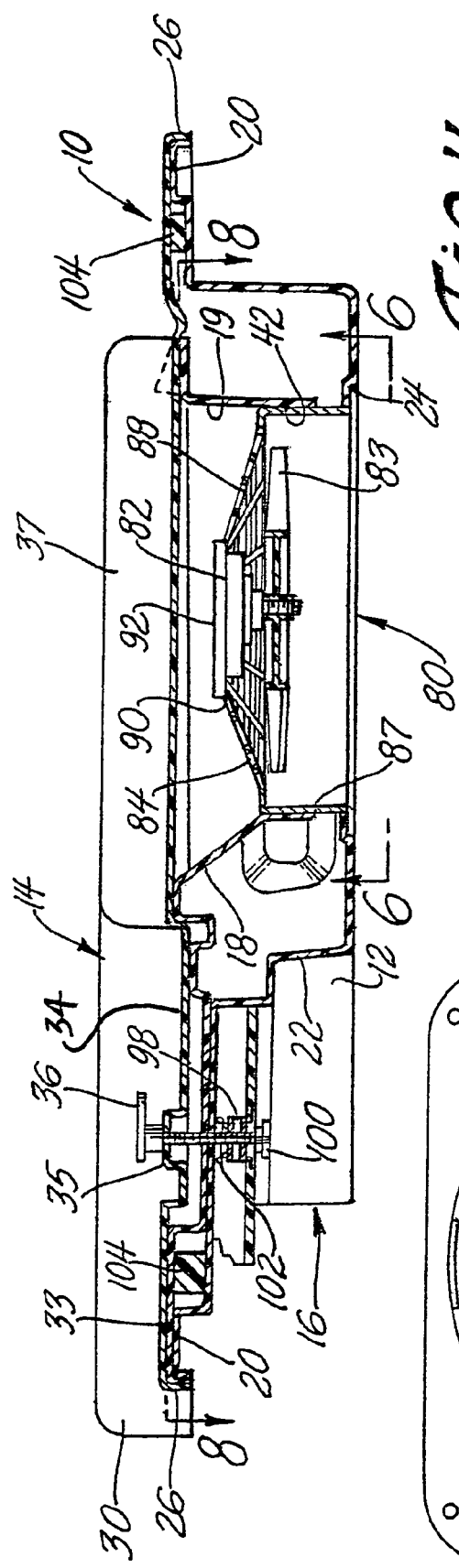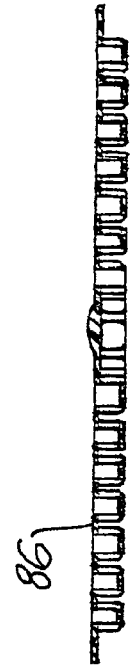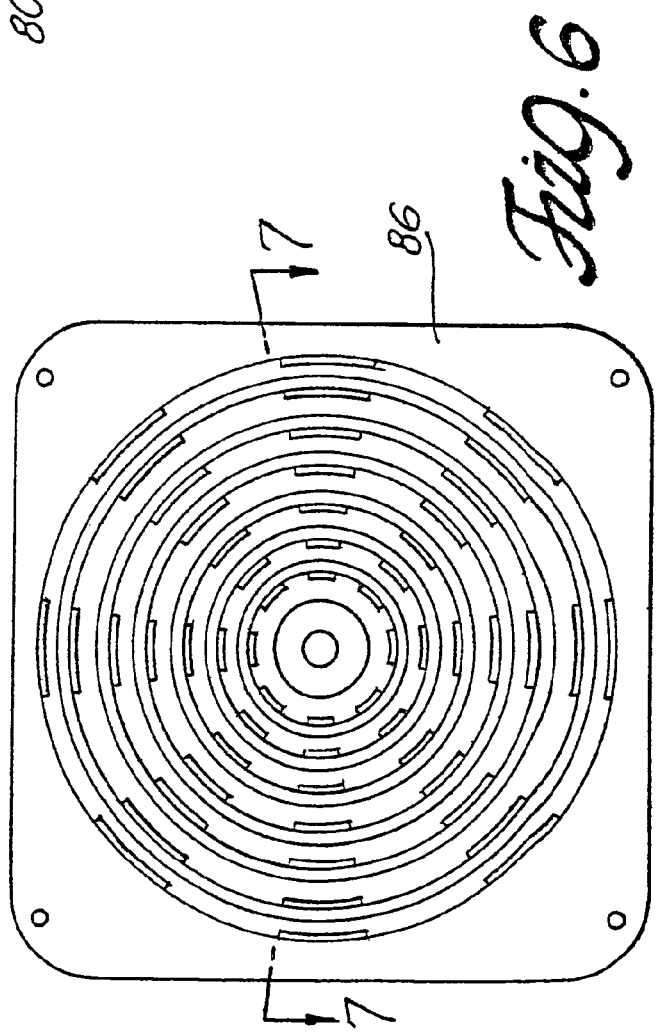

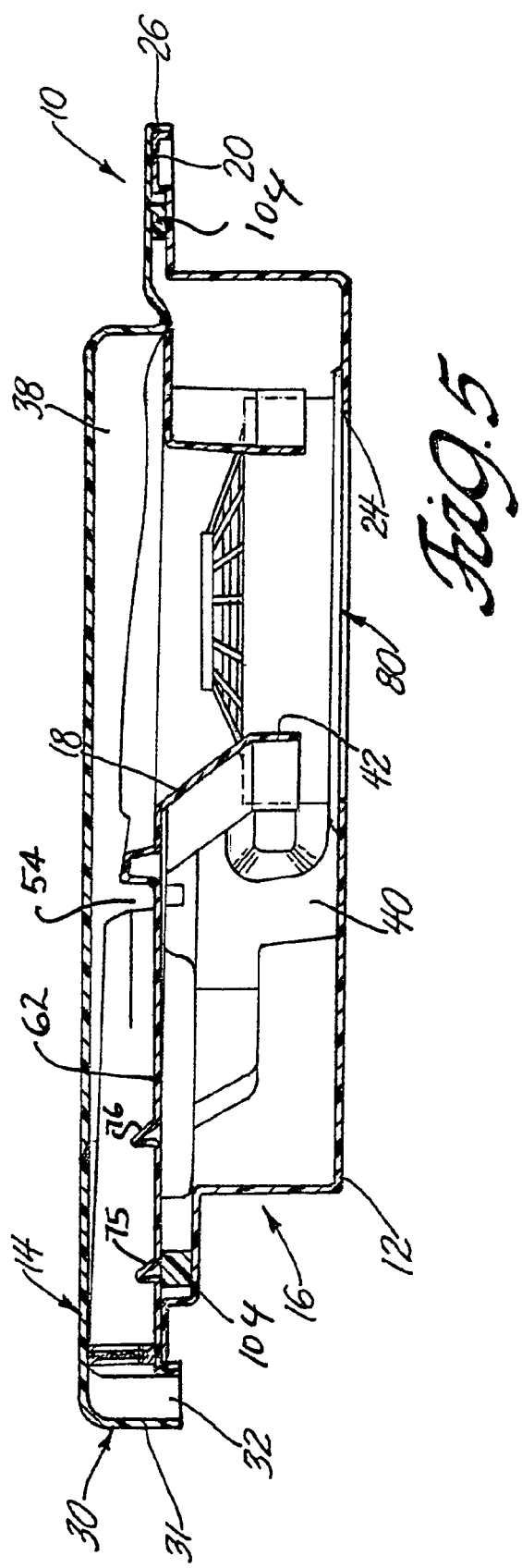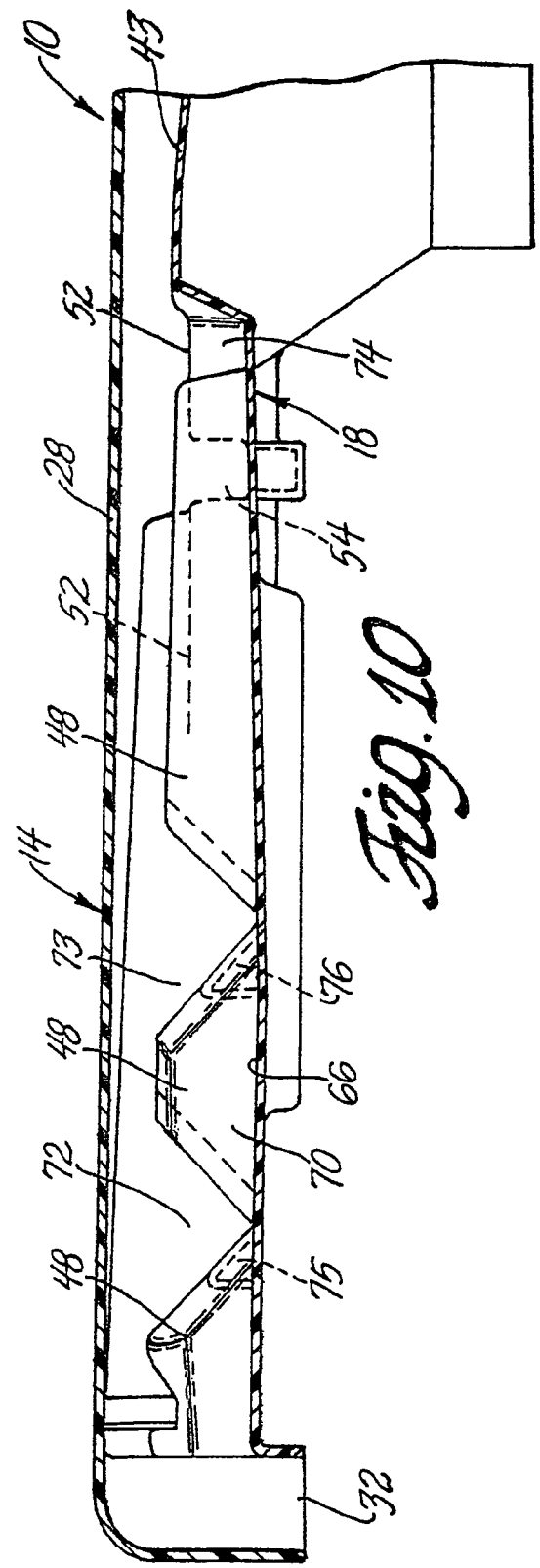

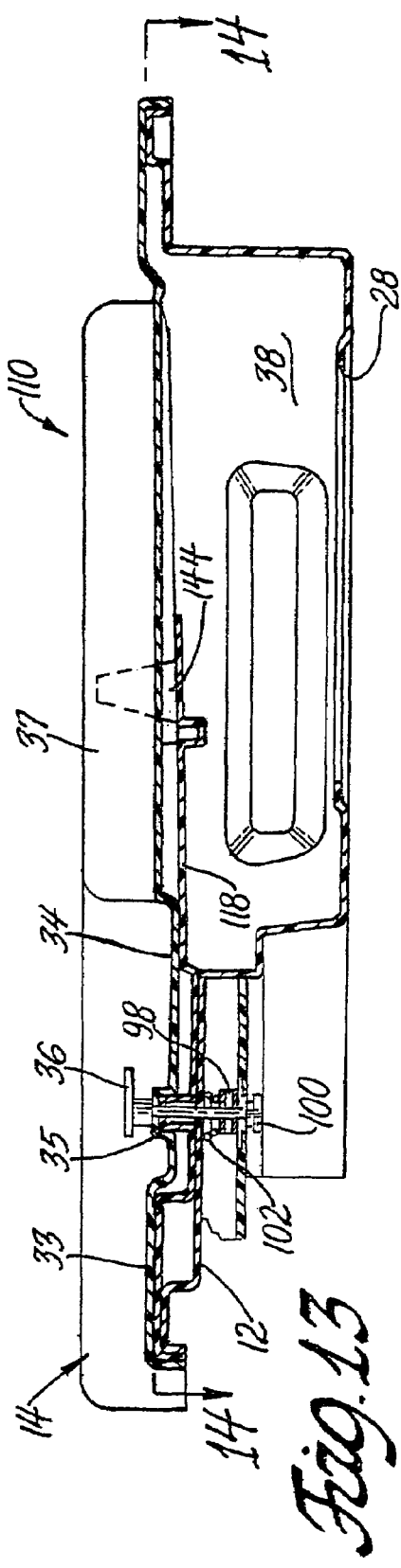
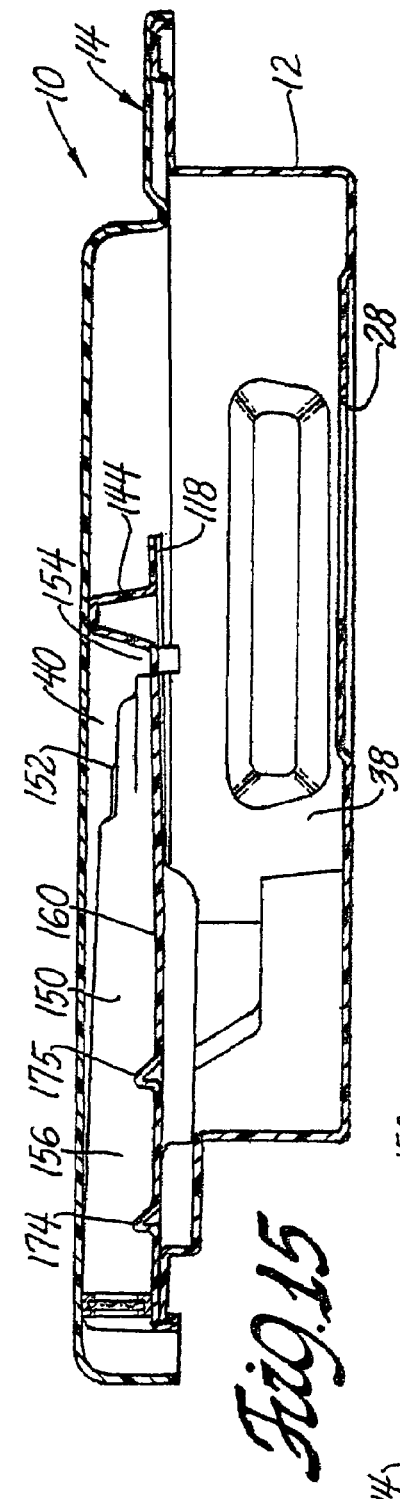
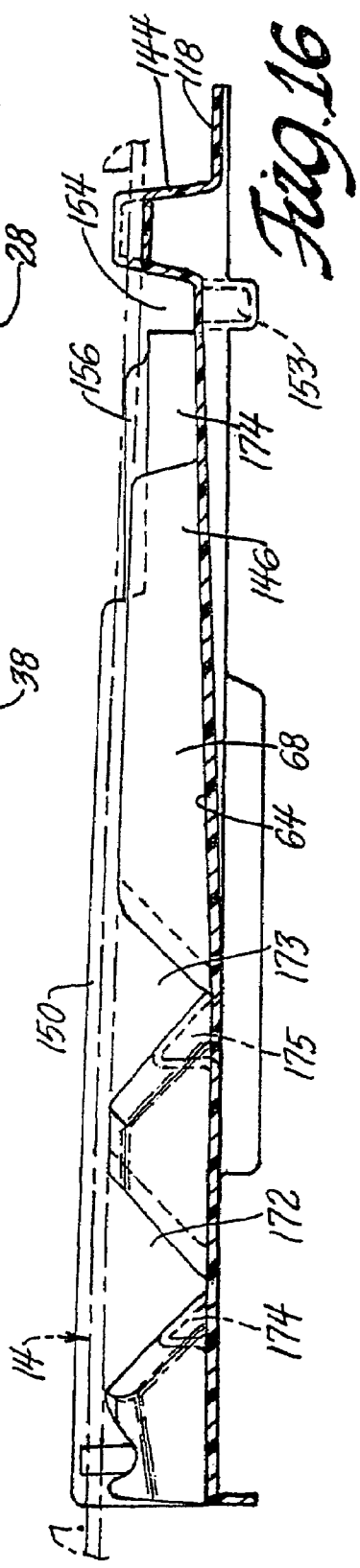

VENT ASSEMBLY WITH SINGLE PIECE COVER

RELATED APPLICATIONS

This is a continuation-in-part application of U.S. patent application Ser. 10/503,190 filed Jul. 29, 2004 which claims benefit of International Application Number PCT/US/2003/019417 filed Jun. 20, 2003 and U.S. Provisional Patent Application No. 60/390,375 filed Jun. 21, 2002.

FIELD OF THE INVENTION

This invention relates to vent assemblies for mounting on vehicle roofs, particularly, roofs of school and transit busses.

BACKGROUND OF THE INVENTION

U.S. Pat. No. 4,592,269 granted to Ronald C. Lamparter Jun. 3, 1986 for a static vent device discloses a static vent assembly for a vehicle such as a school or transit bus wherein the interior of the vehicle is continuously vented to the atmosphere in such a way as to prevent the ingress of rain water into the passenger compartment.

U.S. Pat. No. 4,895,065 granted to Ronald C. Lamparter Jan. 23, 1990 for a combined static and powered vent assembly discloses a combined static and powered vent assembly for a vehicle such as a school or transit bus wherein the interior of the vehicle is continuously vented to the atmosphere in such a way that the forward movement of the bus causes an eductive drawing of air from the vehicle interior and which also includes a powered fan device for venting the vehicle interior when static or eductive venting is inadequate.

U.S. Pat. No. 4,433,506 granted to Donald L. Manning discloses a combined vent and escape hatch for a vehicle such as a school or transit bus which has a lid or cover for the vehicle roof opening. The cover has two linkages hinging opposite ends of the cover to the roof structure of the bus so that the cover can be tilted forward, tilted rearward or lifted away from the vehicle roof manually to vent the interior of the vehicle. Separable parts of one of the linkages are separated to permit the cover to be swung open fully to provide an escape hatch through the vehicle opening. Separation of the linkage parts is controlled by interior and exterior manual operators—an interior handle and an exterior knob. U.S. Pat. No. 4,964,673 granted to Ronald C. Lamparter Oct. 23, 1990 discloses another combined vent and escape hatch assembly of the same general type. The cover in the combined vent and escape hatch assemblies disclosed in these two patents is tilted or lifted away from the vehicle roof manually to vent the vehicle interior and pulled down manually to the closed position.

U.S. Pat. No. 6,572,182 granted to Ronald C. Lamparter et al. Jun. 3, 2003 discloses a vent and escape hatch assembly that is motorized, so that the cover is moved by motors to virtually any raised or tilted position or to a closed position. Separation of the linkage parts is still controlled manually to open the cover fully to provide an escape hatch.

The vent assemblies and the combined vent and escape hatches disclosed in these patents are satisfactory for their intended purpose and have been in commercial use for several years. However, further improvements are possible. For instance, the static vent assembly and the combined static and powered vent assembly disclosed in the Lamparter '269 patent and the Lamparter '065 patent both include a two-piece cover in which a smaller cover member is attached to a central region of a larger cover member. Both cover members are exposed to the environment which raises a number of concerns. First and foremost, the two-piece cover is erroneously perceived as providing a leakage path via the seam where the smaller cover member is attached to the larger cover member. The seam between the smaller cover member and the larger cover member collects dirt and is difficult to clean. Moreover, the two piece cover is not perceived as aesthetically pleasing or aerodynamically efficient.

On the other hand, the combined vent and escape hatch assemblies disclosed in the Manning '506 patent, the Lamparter '673 patent and the Lamparter et al. '182 patent do not provide any venting in the closed position nor prevent the ingress of rain water into the passenger compartment in any of its venting positions.

U.S. patent application Ser. No. 10/503,190 filed Jul. 29, 2004; International Application Number PCT/US/2003/019417 filed Jun. 20, 2003 and U.S. Provisional Patent Application No. 60/390,375 filed Jun. 21, 2002 disclose an improved vent assembly for the roof of a vehicle, such as a school or transit bus in which the cover is a single piece to provide a vent assembly that is leak proof, aesthetically pleasing and aerodynamically efficient when the vent assembly is attached to the vehicle roof.

SUMMARY OF THE INVENTION

This invention also provides an improved vent assembly for the roof of a vehicle, such as a school or transit bus.

In one aspect, the improved vent assembly of the invention has an improved internal drainage system to prevent any water entering an external exhaust outlet of the vent assembly and flowing back through an internal exhaust passage into an internal exhaust inlet opening into the passenger compartment of the school or transit bus. The improved internal drainage system is characterized by at least one cross passage leading from the internal exhaust passage to an internal drain passage that is associated with a dam in the exhaust passage.

In another aspect, the improved internal drainage system is characterized by a transverse drainage passage that equalizes water level at the interior ends of parallel exhaust passages in systems employing two exhaust passages leading from an inlet or inlets to separate outlets. Either aspect results in an improved internal drainage system and in some instances both aspects may be employed for an enhanced improvement.

In yet another aspect, the improved vent assembly of the invention has an external drainage system to prevent the formation of ice that may interfere with the operation of the vent assembly when used as an escape hatch.

The improved vent assembly includes a static vent whereby the interior of the vehicle is continuously vented to the atmosphere in such a way so as to prevent the ingress of rain water into the vehicle compartment. The improved vent assembly may also include a powered fan unit for venting the vehicle interior when static or eductive venting is inadequate.

Alternatively, the improved vent assembly may also serve as a cover in a combined vent and escape hatch assembly such as those disclosed in the '506, '673 and '182 patents discussed above by attaching linkages to the vent assembly for hinging opposite ends of the vent assembly to the vehicle roof. For such use, the improved vent assembly preferably includes spaces for interior and exterior operators for separating parts of one of the linkages and opening the vent assembly fully, and/or finger grips for pulling the vent assembly to the closed position. The improved vent assembly equipped with a powered fan device may also serve as a cover in a combined vent and escape hatch assembly. Another alternative is to include an interior light and lens.

The improved vent assembly may include a powered fan unit to provide a power vent.

The improved vent assembly may include a light unit and lens that is attached to the base or to the partition and juxtaposed the base.

The improved vent assembly may be attached to a vehicle roof by hinging opposite ends of the vent assembly to a mounting ring that is adapted for attachment to the roof of a transit bus or the like to outline a hole through the roof, so that the vent assembly can be lifted and/or tilted with respect to the roof for venting or opened fully to provide an escape through the hole in the roof.

The improved vent assembly of the invention may be especially shaped to serve as the cover for a combined vent and escape hatch assembly that can be tilted or lifted off a vehicle roof or moved to an open position to provide an escape hatch and may be shaped for such service.

Other features and advantages of the invention will become apparent from the following description of preferred embodiments in connection with the drawings that are briefly described below.

BRIEF DESCRIPTION OF THE DRAWINGS

FIG. 4 is a longitudinal section view of the vent assembly taken substantially along the line 4—4 of FIG. 1 looking in the direction of the arrows;

FIG. 5 is a longitudinal section taken substantially along the line 5—5 of FIG. 1 looking in the direction of the arrows;

FIG. 6 is partial bottom view taken substantially along the line 6—6 of FIG. 4 looking in the direction of the arrows;

FIG. 7 is a section view taken substantially along the line 7—7 of FIG. 6 looking in the direction of the arrows;

FIG. 10 is a section taken substantially along the line 10—10 of FIG. 9 looking in the direction of the arrows;

FIG. 13 is a longitudinal section view of the modified vent assembly taken substantially along the line 13—13 of FIG. 12 looking in the direction of the arrows;

FIG. 15 is longitudinal view taken substantially along the line 15—15 of FIG. 12 looking in the direction of the arrows;

FIG. 16 is a section taken substantially along the line 16—16 of FIG. 12 looking in the direction of the arrows.

DETAILED DESCRIPTION OF PREFERRED EMBODIMENTS

Figure 1:
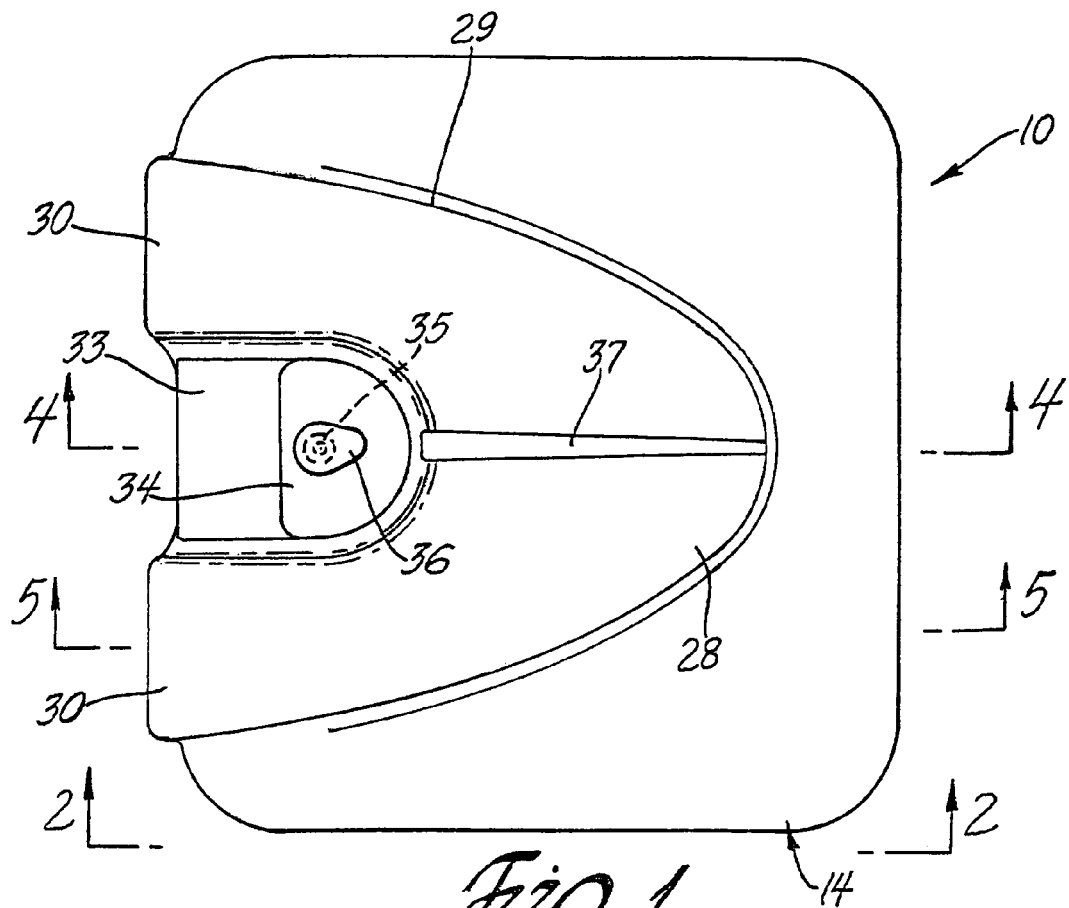
FIG. 1 is top view of an improved vent assembly in accordance with the invention.
Figure 2:
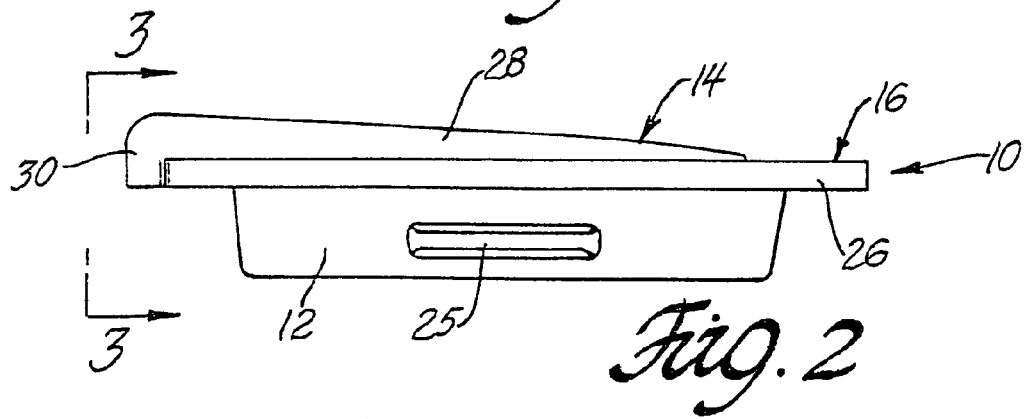
FIG. 2 is a side view of the vent assembly taken substantially along the line 2—2 of FIG. 1 looking in the direction of the arrows.

Referring now to the drawings, a vent assembly 10 according to the invention is disclosed. The vent assembly 10 comprises a base 12, a cover 14 that is attached to base 12 to form a housing 16 and a partition 18 that is inside the housing to establish a vent path from an inlet in base 12 to an outlet in cover 14 and a water barrier to prevent the flow of water from the outlet in cover 14 back to the inlet in base 12.

Base 12 may be made economically from a sheet of plastic material that is formed to shape by thermo-forming or the like. Base 12 has a rim 20 that is preferably in the form of a downwardly open U-shaped section and continuous to provide a rigid attachment for cover 14. The central portion of base 12 is depressed to provide a pan 22. The bottom of pan 22 has generally rectangular opening that serves as an inlet 24 into the housing 16. The sides of the pan 22 have elongated finger depressions 25. Finger depressions are an optional feature for a combined vent and escape hatch as explained below.

Cover 14 is preferably of one-piece construction and may also be made economically from a sheet of plastic material that is formed to shape by thermo-forming or the like. Cover 14 has a rim 26 that is preferably in the form of a downwardly extending flange and that is continuous except for a portion at the rear of cover 14 as explained below. Cover 14 has a generally parabolic dome 28, the nose of which faces forward. Cover 14 may include a styling depression 29 that outlines the forward portion of generally parabolic dome 28.

The forward portion of dome 28 is disposed over inlet 24. Dome 28 has rearward extensions 30. Each reward extension 30 has a generally vertical deflector wall 31 that is spaced rearward of rim 26 at the lower end to form an outlet 32 for housing 16. The deflector wall 31 deflects environmental water away from outlet 32. Deflector wall 31 is preferably deep enough so that outlet 32 is substantially horizontal and the environmental water is deflected away from a direct horizontal path into any part of outlet 32.

Figure 3:
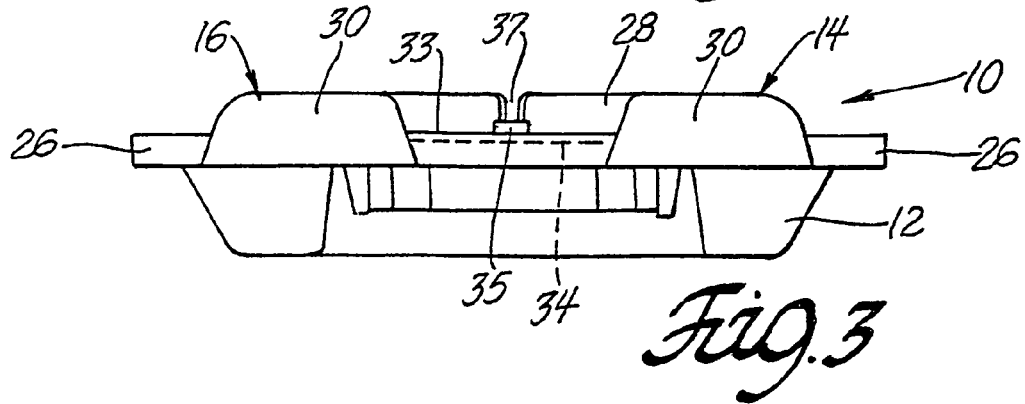
FIG. 3 is a rear view of the vent assembly taken substantially along the line 3—3 of FIG. 2 looking in the direction of the arrows.

The rearward portion of dome 28 includes a depression comprising a low shelf 33 between extensions 30 and a lower recess 34 ahead of shelf 33. The depression provides space for an optional operating handle 36 that extends through a boss 35 in recess 34. The forward portion of dome 28 includes a drain channel 37 that leads forward from recess 34 to an opening at the nose of dome 28 as best shown in FIGS. 1, 3 and 5. Drain channel 37 is part of an external drainage system that limits the level of water that is accumulated in recess 34 so that the top of boss 35 is not submerged in water and subject to the formation of ice that may interfere with operation of handle 36. The floor of drain channel 37 is lower than the top of boss 35 and preferable slopes downwardly in the forward direction. The upper surface of shelf 33 is also lower than the top of boss 35. The rearward portion of dome 28 is bifurcated by the low shelf 33 and lower recess 34 so that two extensions 30 provide two outlets 32 that are laterally spaced from each other. Shelf 33 preferably ends in a matching downwardly extending flange in alignment with rim 26.

Partition 18 may also be made economically from a sheet of material that is formed to shape by thermo-forming or the like. Partition 18 divides the interior of housing 16 into upper and lower compartments 38 and 40. Partition 18 fits inside cover 14 and has a flat margin 41 that engages an inside surface of the cover 14 outwardly of dome 28. Margin 41 may be secured to cover 14 in any suitable manner, for instance by bonding or welding. Partition has a depending annular flange 19 that defines large opening 42 at the bottom of the flange that is aligned with inlet 24. A semi-elliptic rib 43 at the top of the flange 19 is outward of the opening 42 and in contact with an inside surface of dome 28 at a forward end of the dome. The tip of the curved semi-elliptic rib 43 has a notch 44 to accommodate drainage channel 37.

Figure 8:
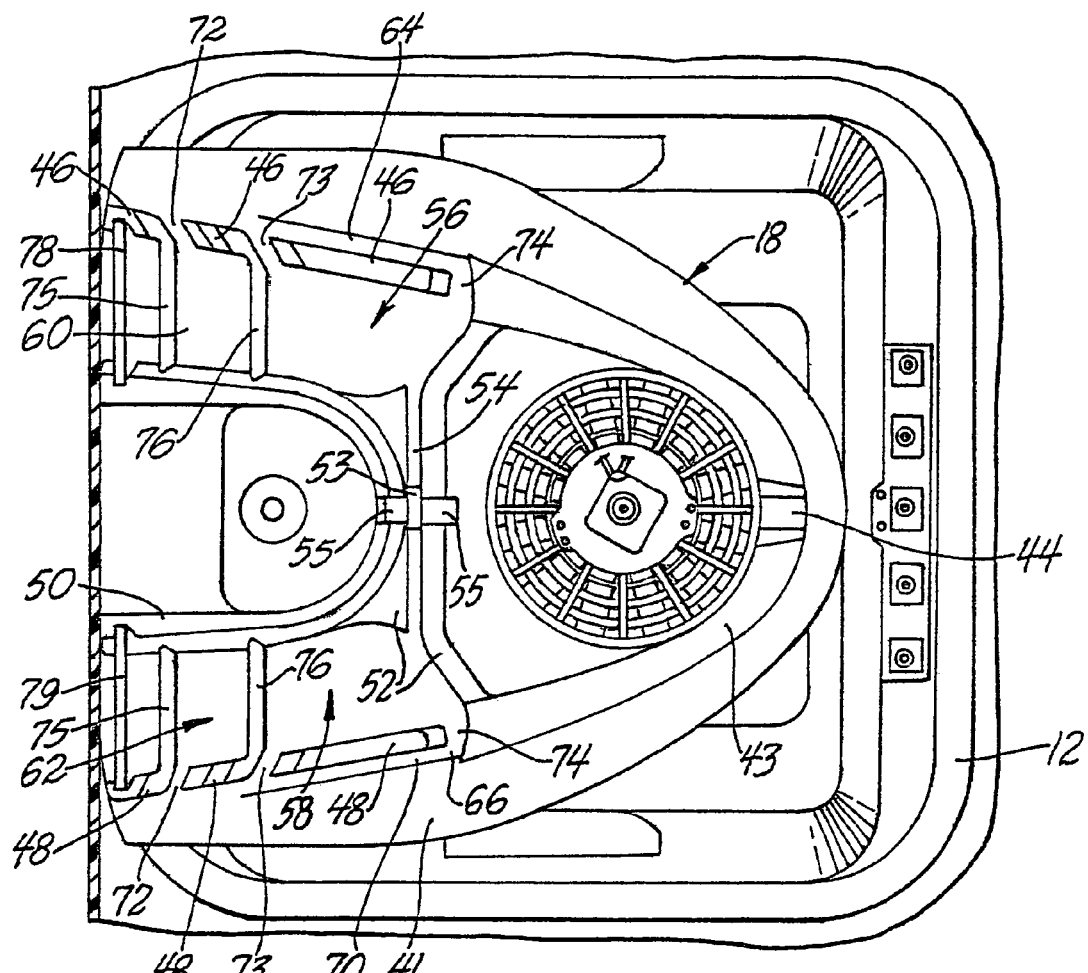
FIG. 8 is a section view taken substantially along the line 8—8 of FIG. 4 looking in the direction of the arrows.
Figure 11:
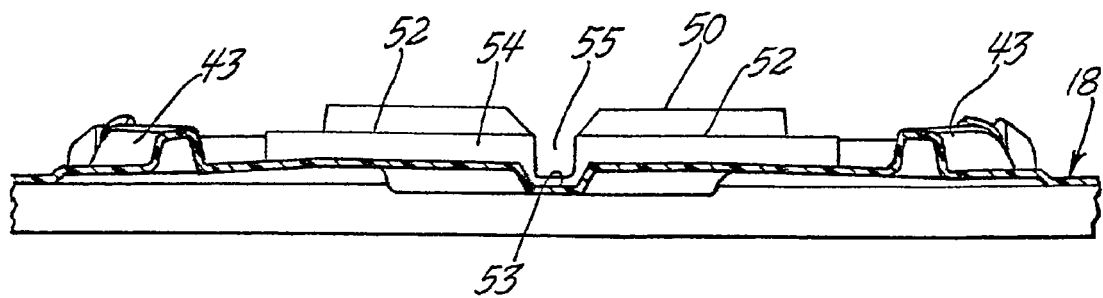
FIG. 11 is a section taken substantially along the line 11—11 of FIG. 9 looking in the direction of the arrows.
Figure 9:
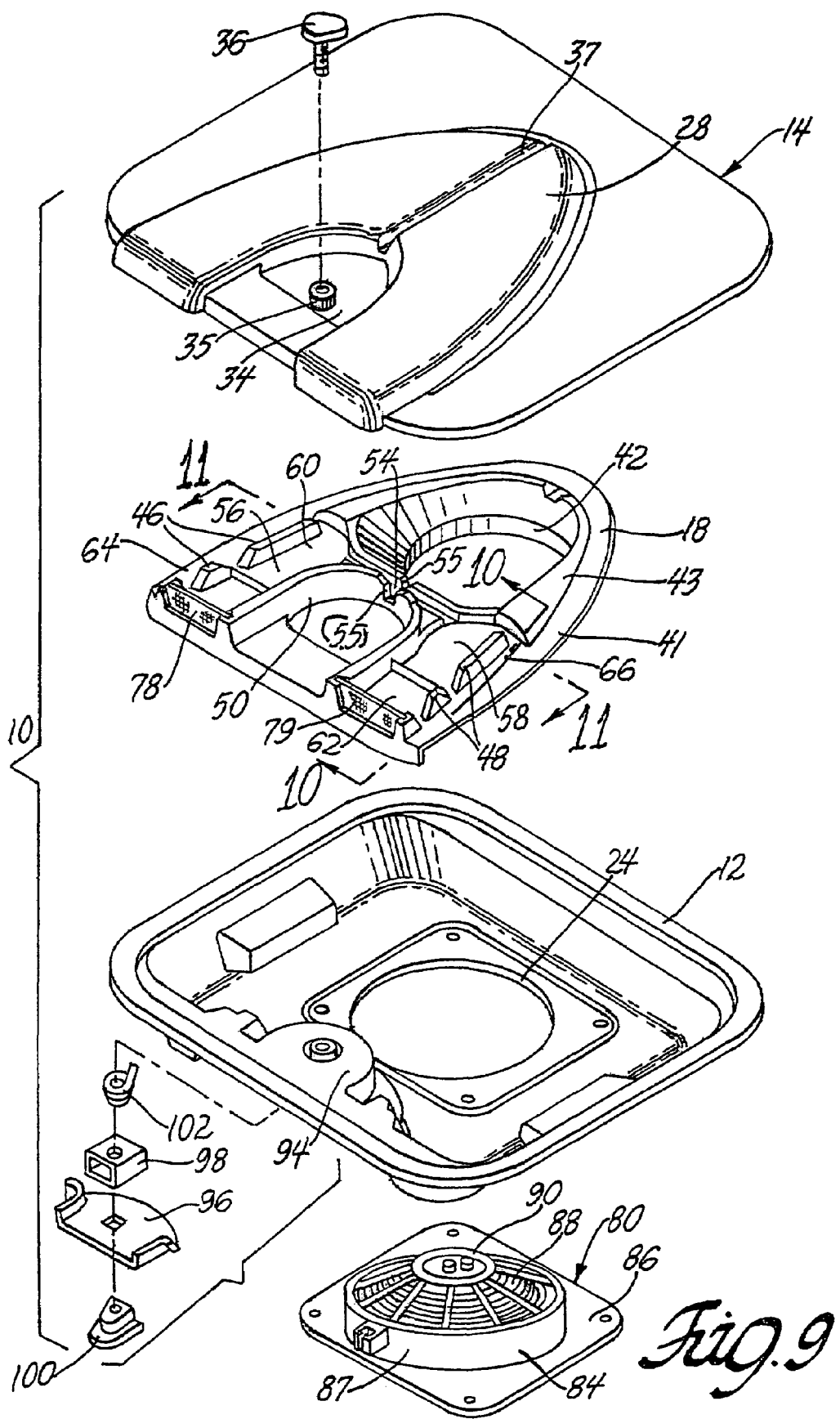
FIG. 9 is an exploded perspective view of the vent assembly.
Figure 12:
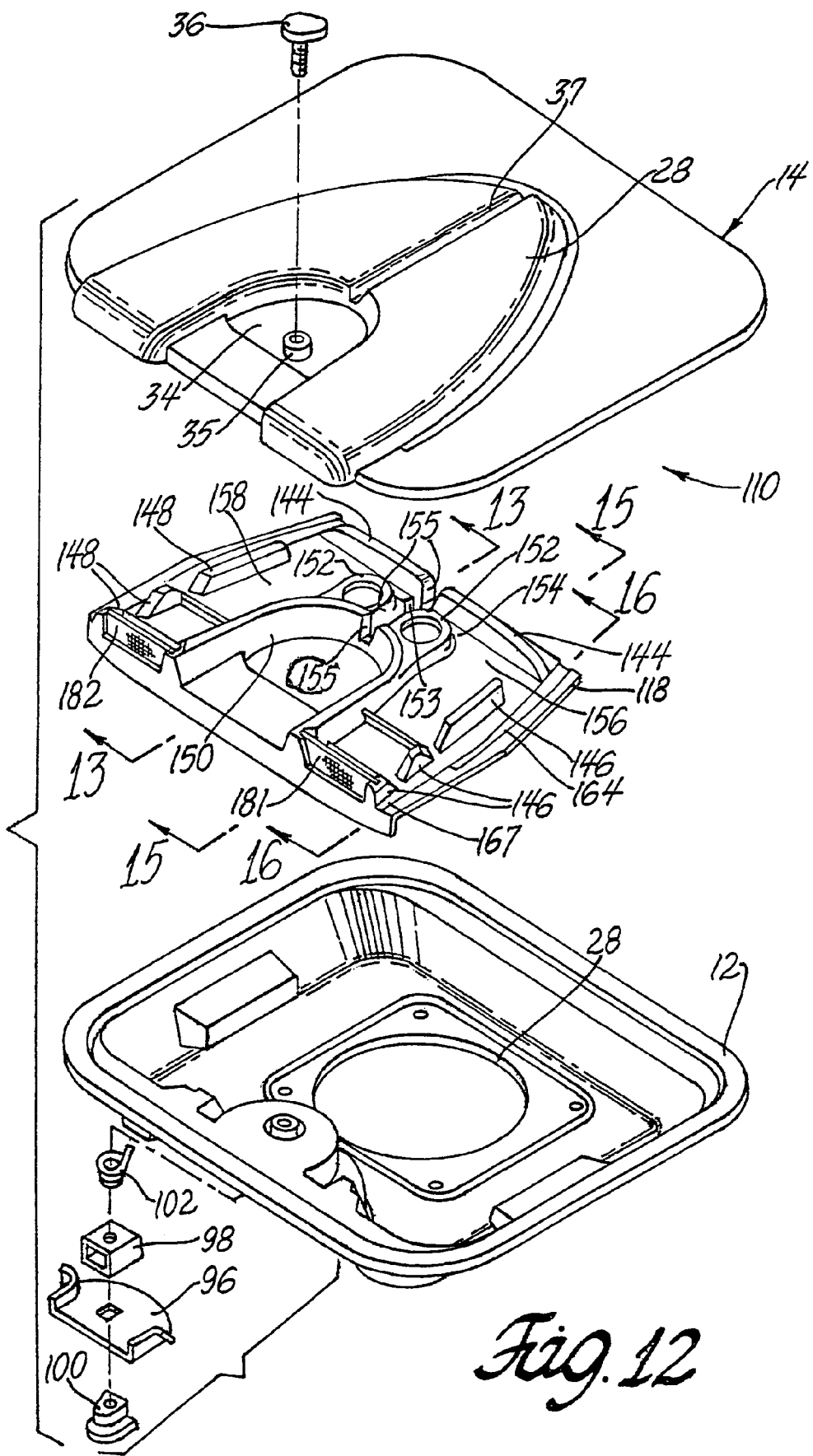
FIG. 12 is an exploded perspective view of a modified vent assembly in accordance with the invention.

Partition 18 also has side ribs 46 and 48, a rear horseshoe rib 50 and a platform 52 that extends laterally across the width of the partition 18 between the rearward ends of the semi-elliptic rib 43 and rearwardly to the nose portion of the horseshoe rib 50. Platform 52 is spaced from the inside surface of dome 28 of cover 14 to provide an air flow exhaust path over platform 52 from opening 42 into exhaust passages 56 and 58 between horseshoe rib 50 and the side ribs 46 and 48, respectively. Platform 52 has a transverse drain passage 54 that extends completely across the platform 52 as best shown in FIGS. 8 and 9. The center portion 53 of drain passage 54 is relieved so that the drain channel 37 of cover 14 can be fit in aligned notches 55 in rib 50 and platform 52 without blocking flow through the transverse drain passage 54.

Partition 18 provides floors 60 and 62 for respective exhaust passages 56 and 58 that slant upwardly in the forward direction (FIGS. 5 and 9) and that are connected at their upper ends by the transverse drain passage 54. Partition 18 also provides floors 64 and 66 for respective drain passages 68 and 70 that are located between side ribs 46 and 48 and the sides of the dome 28 of cover 14 and that slant downwardly in the rearward direction (FIGS. 9 and 10). Side ribs 46 and 48 each have at least one and preferably a plurality of cross passages 72, 73 and 74 that connect the respective exhaust passages 56 and 58 to the respective drain passages 68 and 70. Cross passages 72, 73 and 74 preferably slant outwardly and down from the respective exhaust passages 56 and 58 to the respective drain passages 68 and 70.

The floors 60 and 62 of the respective exhaust passages 56 and 58 each have at least one and preferably a plurality of dams 75 and 76 that are located at the rearward edges of cross passages 72 and 73 respectively (FIGS. 5, 9 and 10). The floors 64 and 66 of drain passages 68 and 70 slant downwardly in the rearward direction to the outer portions of outlets 32 near the outer sides of extensions 30. Cover 14 is preferably bonded, welded or otherwise suitably secured to the upper surfaces of forward rib 43, side ribs 46 and 48 and horseshoe rib 50. As indicated above, the bottom of styling depression 29 outlining the dome 28 of cover 14 is also preferably bonded, welded or otherwise suitably secured to the margin 41 of partition 18. Margin 41 may have a slight trough (not shown) to accommodate the styling depression 29 if one is used. The rim 26 of cover 14 is also preferably bonded, welded or otherwise suitably secured to the outside of the rim 20 of base 12 with a rearward flange 19 of partition 18 sandwiched between the rims as best shown in FIG. 4. This securement strengthens the cover 14 as well as seals the various passages provided by partition 18.

The rearward ends of horseshoe rib 50 and side ribs 46 and 48 are notched to support filter screens 78 and 79 adjacent the respective ends of exhaust passages 56 and 58 near outlet 32. The screens 78 and 79 filter out insects, leaves and other debris.

Vent assembly 10 is a power vent and includes a fan assembly 80 that comprises an electric motor 82, a vaned rotor 83, a fan housing 84 and a grill 86. Fan housing 84, which may be an economical injection molded plastic part, comprises a generally circular shroud 87 that has an upper frusto-conical screen 88 that terminates in a mounting annulus 90. Electric motor 82 has an end plate 92 that is attached to the upper side of the mounting annulus 90 with the electric motor disposed in the upper end of the fan housing 84 Electric motor 82 is drivingly connected to the vaned rotor 83 which is inside the fan housing 84 as best shown in FIG. 4. Rotor 83 may be economically injection molded of a plastic material. Electric motor 82, rotor 83 and fan housing 84 are a sub-assembly. The bottom of fan housing 84 is attached to grill 86 to complete the fan assembly 80. Grill 86 may also be economically injection molded of a plastic material. The fan assembly 80 is attached to vent 10 by inserting the fan housing 84 into the inlet 24 of housing 14 so that the housing 84 is nested in flange 19 and the screen 88 protrudes into the upper compartment 38 and then attaching the grill 86 to the bottom of pan 22 at the four corners of the grill 86.

Housing shroud 87 is disposed in lower compartment 40 of vent housing 16 while screen 88 is disposed in upper compartment 38 as best shown in FIG. 4. Shroud 86 preferably seals against the depending flange 19 of partition 18 when the fan assembly 76 is attached so that air is not blown into lower compartment 40.

Vent assembly 10 operates as follows. Rotor 83 draws air into shroud 87 through grill 86 in cover inlet 24, and then pushes the air over platform 52 into exhaust passages 56 and 58 and out the openings of outlet 32 through filter screens 78 and 79. At the same time, vent assembly 10 provides an improved internal drainage system comprising several barriers that prevent any water entering outlet 32 from flowing back through the exhaust passages 56 and 58 and into inlet 24. The first barrier is the deflector wall 31 that at least inhibits and preferably completely blocks direct horizontal flow into exhaust passages 56 and 58. Next the exhaust passages 56 and 58 themselves provide several barriers. First floors 60 and 62 slope upward in the forward direction so that any water getting past barrier wall 31 must flow up hill and accumulate enough to flow over dams 75 where the overflow then drains back out through cross passages 72, drain passages 68 and 70 and the outer portions of outlets 32. If the first cross passages do not provide sufficient drainage, the water must still flow uphill and accumulate enough to flow over dams 76 where the overflow then also drains back out drain passages 68 and 70 through cross passages 73. If the second cross section cross passages 73 still does not provide sufficient drainage, the water must still flow uphill to cross passages 74 where the water drains back out drain passages 68 and 70 through cross passages 74. If cross passage 74 still does not provide sufficient drainage, enough water must accumulate to flow over platform 52 which includes transverse drain passage 54 which equalizes the water level at the top of the exhaust passages 56 and 58 to maximize water drainage. Consequently, it can be seen that the improved vent assembly of the invention has an improved internal drainage system that provides several barriers to prevent any water entering outlet 32 from reaching inlet 24. These several barriers allow an enormous accumulation of water in exhaust passages 56 and 58 before any water can spill over platform 52 and down into inlet 24.

As indicated in the introduction, the power vent assembly 10 may be used as a stand alone unit that is attached to a vehicle roof in a fixed manner. However, the power vent may also be used in conjunction with a combined vent and escape hatch such as disclosed in U.S. Pat. Nos. 4,495,731 and 4,964,673; or a combined vent and escape hatch assembly that is motorized, such as disclosed in U.S. Pat. No. 6,572,182. When the power vent 10 is used in conjunction with a combined vent and escape hatch, the entire power vent is the moveable hatch of the escape hatch. Consequently the front and rear ends of the power vent 10 are connected by over center hinges (not shown) to the vehicle roof, one of which would be separable to open the hatch for an emergency escape. In such instances, it is very desirable that the separable hinge be operable from both inside and outside the vehicle as indicated in U.S. Pat. No. 4,433,506 granted to Donald L. Manning Feb. 28, 1984. To this end, the improved vent 10 of the invention is contoured to provide room for interior and exterior handles to detach the separable hinge part and open the escape hatch as well as an exterior drainage system as indicated above. More specifically, the base 10 is provided with a raised platform 94 and may include an exterior adapter 96 for attaching a separable hinge part 98 and an inside operating knob 100 to the vent base 12 while the cover 14 includes the depression comprising shelf 33 and recess 34 to provide room for the outside operating handle 36 as best shown in FIG. 4. As best shown in FIG. 9, handle 36 has a threaded stem that protrudes through aligned holes in boss 35 of cover 14, insert 18, base 12, hinge part 98 and adapter 96 and then screws into inside operating knob 100. Spring 102 biases hinge part 98 downwardly to an engaged position as shown in the Manning '506 patent. To separate hinge part 98 from the flexed hinge part attached to the bus roof, the hinge part 98 is lifted upwardly by outside operating handle 36 or pushed upwardly by inside operating knob 100. As indicated above, cover 14 has an exterior drain channel 37 in dome 28 so that any water that accumulates in the recess 34 in front of shelf 33 is below the top of boss 35 so that any formation of ice in recess 34 does not interfere with the operation of the outside handle 36 or the inside knob 100. In this regard the top of shelf 33 is preferably below the level of the top of boss 35 as shown in FIG. 3.

Power vent assembly 10 also preferably includes two attachment pads 104 inside housing 16 near the fore and aft ends of the housing to facilitate attachment of the over center hinges (not shown) when the power vent assembly is used in conjunction with a combined vent and escape hatch. In this regard, it should be noted that the base 12 of the power vent assembly 10 also preferably includes finger depressions 25 so that the power vent assembly can be gripped and moved manually to any of its venting positions or to its closed position.

Referring now to FIGS. 13 through 17 of the drawings, a modified improved vent assembly 110 according to the invention is disclosed. The vent assembly 110 comprises the base 12, the cover 14 that is attached to base 12 to form the housing 16 and a modified partition 118 that is inside the housing to establish a vent path from the inlet 24 in base 12 to the outlets 32 in cover 14. Base 12 and cover 14 have been described in detail above. Partition 118 has been modified to provide a static vent assembly 110 that does not include a fan assembly.

Figure 17:
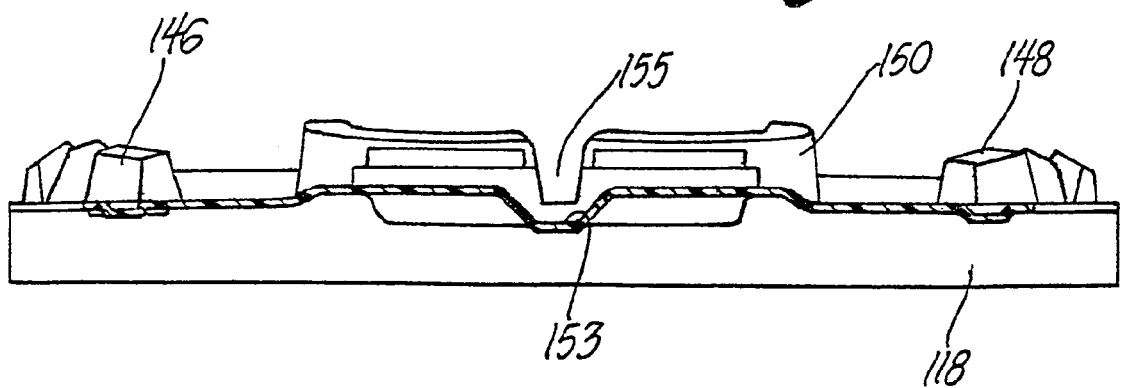
FIG. 17 is a section taken substantially along the line 18—18 of FIG. 14 looking in the direction of the arrows.

Partition 118 may also be made economically from a sheet of material that is formed to shape by thermo-forming or the like. Partition 118 divides the interior of housing 16 into upper and lower compartments 38 and 40 that communicate with each other through openings 142 in partition 118. Partition 118 also has several ribs that engage the inside surface of cover 14 to form various passages in upper compartment 38 in conjunction with cover 14. The several ribs include a forward tranverse rib 144 ahead of openings 142, side ribs 146 and 148 and a rear horseshoe rib 150. Openings 142 are surrounded by a raised platform 152 that is attached to and extends forwardly from horseshoe rib 150 toward forward rib 144. Platform 152 is spaced from cover 14 to provide an air flow path over platform 152 into exhaust passages 156 and 158 between horseshoe rib 150 and platform 152 at the inside and the respective side ribs 146 and 148 at the outside. The exhaust passages 156 and 158 are connected by a transverse drain passage 154 that is between platform 152 and the forward transverse rib 144. Rib 144, platform 152 and rib 150 have aligned notches 155 to accommodate drainage channel 37 in the dome 28 of cover 14. The middle portion 153 of the traverse drainage passage 154 is relieved so that the drain channel 37 does not block flow through the transverse drain passage 154 when the drain channel 37 is disposed in the aligned notches 155 as best seen in FIG. 17.

Partition 118 provides floors 160 and 162 for respective exhaust passages 156 and 158 that slant upwardly in the forward direction toward the transverse rib 144 (FIG. 15). Partition 118 also provides respective floors 164 and 166 for drain passages 168 and 170 that are between side ribs 146 and 148 and the sides of the dome 28 of the cover 14. Floors 164 and 166 slant downwardly in the rearward direction to drain outlets 165 and 167 at the outer the outer sides of extensions 30 as best shown in FIG. 16. Cross passages 172, 173 and 174 extend through the side ribs 146 and 148 to connect the exhaust passages 156 and 158 to the drain passages 168 and 170 respectively. Cross passages 172, 173 and 174 preferably descend outward and downward from the exhaust passages 156 and 158 to the respective drain passages 168 and 170. Floors 160 and 162 have dams 176 and 178 at the rearward edges of the cross passages 172 and 173 respectively (FIGS. 16 and 17).

Figure 14:
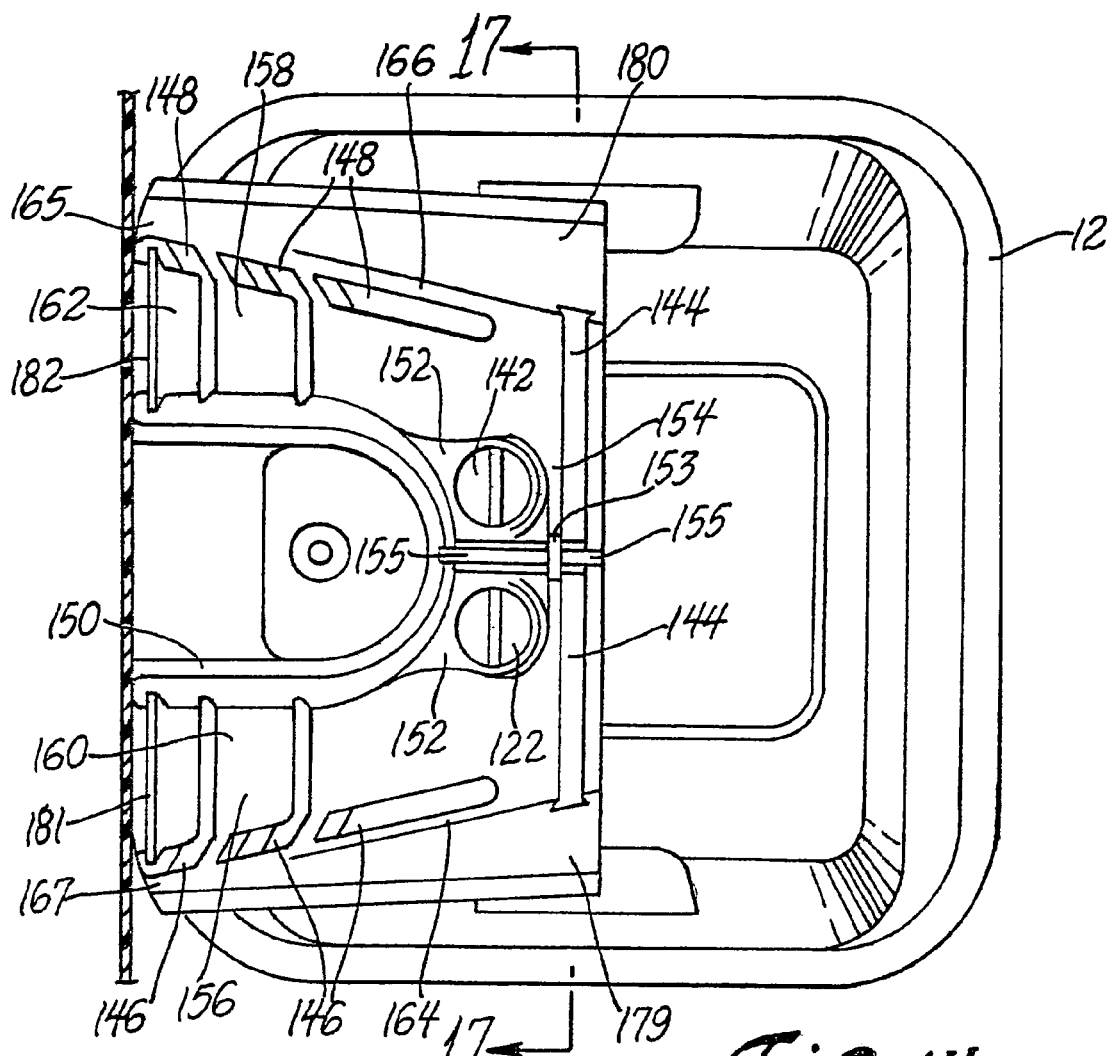
FIG. 14 is a top view of the modified vent assembly with the cover removed.

Cover 14 is preferably bonded, welded or otherwise suitably secured to the upper surfaces of forward rib 144, side ribs 146 and 148 and horseshoe rib 150. Styling depression 129 of cover 114 is also preferably bonded welded or otherwise suitably secured to the side margins 179 and 180 of partition 118. The rim 26 of cover 14 is also preferably bonded, welded or otherwise suitably secured to the outside of the rim 20 of base 12 with a rearward flange 119 of partition 118 sandwiched between as best shown in FIG. 14. This securement strengthens the cover 114 as well as seals the various passages provided by partition 118.

The rearward ends of horseshoe rib 150 and side ribs 146 and 148 are notched to support filter screens 181 and 182 adjacent the respective ends of exhaust passages 156 and 158 near outlets 32. The screens 181 and 182 filter out insects, leaves and other debris.

Vent assembly 110 which is a static vent that does not include a fan assembly as in the case of the vent assembly 10 described above, operates as follows. When the vent assembly 110 is attached to a bus roof and the bus travels forward, a vacuum or negative pressure is created at outlets 32. This vacuum draws air into lower chamber 140 through inlet 24 and then through openings 142 into upper chamber 38 then through exhaust passages 156 and 158 and out the outlets 32 through filter screens 181 and 182. At the same time, vent assembly 110 provides several barriers that prevent any water entering outlets 32 from reaching inlet 24. The first barrier is the deflector wall 31 that at least inhibits and preferably completely blocks direct horizontal flow into exhaust passages 156 and 158. Next the exhaust passages 156 and 158 themselves provide several barriers. First exhaust passages 156 and 158 have floors 160 and 162 that slope upward in the forward direction so that any water getting past barrier wall 31 must flow up hill accumulate enough water to flow over dams 175 whereupon the water is drained back out through cross passages 172 and drainage passages 168 and 170. If this drainage is insufficient, then sufficient water must accumulate in exhaust passages 156 and 158 to flow uphill to and over dams 176 whereupon water is also drained back out through cross passages 173 and drainage passages 168 and 170. If this still does not provide sufficient drainage, the water must still flow uphill to cross passages 174 where the water drains back out drain passages 168 and 170 through cross passages 174. It should be noted that partition 118 also includes a transverse drain passage 154 which equalizes the water level at the top of the exhaust passages 156 and 158 to maximize water drainage. If this still does not provide sufficient drainage, enough water must accumulate to flow over platform 152. Consequently, it can be seen that this modified embodiment of the vent assembly of the invention also provides several barriers that prevent any water entering outlet 32 from reaching inlet 24. These several barriers allow an enormous accumulation of water in exhaust passages 156 and 158 before any water can spill over platform 152 and down into inlet 24.

As indicated in the introduction, the static vent assembly 110 may be used as a stand alone unit that is attached to a vehicle roof in a fixed manner. However, the static vent may also be used in conjunction with a combined vent and escape hatch such as disclosed in U.S. Pat. Nos. 4,495,731 and 4,964,673; or a combined vent and escape hatch assembly that is motorized, such as disclosed in U.S. Pat. No. 6,572,182. When the static vent 110 is used in conjunction with a combined vent and escape hatch, the entire static vent is the moveable hatch of the escape hatch. Consequently the front and rear ends of the static vent 110 are connected by over center hinges (not shown) to the vehicle roof, one of which would be separable to open the hatch for an emergency escape. In such instances, it is very desirable that the separable hinge be operable from both inside and outside the vehicle as indicated in U.S. Pat. No. 4,433,506 granted to Donald L. Manning Feb. 28, 1984. To this end, the vent 110 of the invention is contoured to provide room for interior and exterior handles to detach the separable hinge part and open the escape hatch. More specifically, the base 10 is provided with the raised platform 94 and may include the exterior adapter 96 for attaching the separable hinge part 98 and an inside operating knob 100 to the vent base 12 while the cover 14 includes the depression 134 to provide room for the outside operating handle 36. As best shown in FIG. 17, handle 36 has a threaded stem that protrudes through holes in cover 14, base 10, hinge part 98 and adapter 96 and then screws into inside operating knob 100. Spring 102 biases hinge part 98 downwardly to an engaged position as shown in the Manning '506 patent. To separate hinge part 98, the hinge part is lifted upwardly by outside operating handle 36 or pushed upwardly by inside operating knob 00.

Static vent assembly 110 also preferably includes two attachment pads 104 inside housing 16 (as shown in FIG. 4) near the fore and aft ends of the housing to facilitate attachment of the over center hinges (not shown) when the static vent assembly is used in conjunction with a combined vent and escape hatch. In this regard, it should be noted that the static vent assembly 110 also preferably includes the finger depressions 25 so that the static vent assembly can be gripped and moved manually to any of its venting positions or to its closed position.

The description and drawings illustratively set forth my presently preferred invention embodiments. I intend the description and drawings to describe these embodiments and not to limit the scope of the invention. Obviously, it is possible to modify these embodiments while remaining within the scope of the following claims. Therefore, within the scope of the claims, one may practice the invention otherwise than as the description and drawings specifically show and describe.

We claim:

1. A vent assembly for attachment to the roof of a vehicle comprising;
    a base having an inlet extending through a wall of the base,
    a cover attached to the base to form a vent housing,
    spaced outlets at the rear end of the cover, and
    a partition disposed in the housing to provide exhaust passages leading from the inlet to the respective spaced outlets,
    the partition providing an internal drainage system inhibiting water flow from the outlet back to the inlet comprising a barrier in each of the exhaust passages and a transverse drainage passage connecting the exhaust passages.

2. The vent assembly as defined in claim 1 wherein the partition defines an upper compartment and a lower compartment that communicates with the upper compartment via an opening through the partition, the partition providing the barrier in each of the exhaust passages that inhibits water flowing from the outlets back through the inlet via the opening through the partition.

3. The vent assembly as defined in claim 2 wherein the partition has a platform that is above the outlet and wherein the opening through the partition is through the platform and the transverse drainage passage is rearward of the opening through the partition.

4. The vent assembly as defined in claim 3 wherein the transverse drainage passage is through the platform.

5. The vent assembly as defined in claim 3 wherein the transverse drainage passage is forward of the platform.

6. The vent assembly as defined in claim 2 wherein the barrier in each of the exhaust passages that is provided by the partition comprises a floor that slants upwardly from the outlet toward a forward end of the cover and a dam in the exhaust passage provided by the floor.

7. The vent assembly as defined in claim 6 wherein each of the exhaust passages comprises a longitudinal rib of the partition, wherein the vent assembly comprises a drain passage between the spaced longitudinal rib of each of the exhaust passages and a wall of the cover, and wherein the longitudinal rib of each of the exhaust passages has a cross passage connecting the exhaust passage to the drain passage, the cross passage being forward of the dam.

8. The vent assembly as defined in claim 7 wherein the dam has a forward edge and the cross passage is at the forward edge of the dam.

9. The vent assembly as defined in claim 7 wherein each of the exhaust passages has a second dam provided by the floor and a second cross passage connecting the exhaust passage to the drain passage, the second cross passage being forward of the second dam.

10. The vent assembly as defined in claim 9 wherein the second dam has a forward edge and the second cross passage is at the forward edge of the second dam.

11. A vent assembly for attachment to the roof of a vehicle comprising;

a base having an inlet extending through a wall of the base, a cover attached to the base to form a vent housing, an outlet at the rear end of the cover, and a partition disposed in the housing to provide an exhaust passage from the inlet to the outlet, the partition providing an internal drainage system inhibiting water flow from the outlet back to the inlet comprising a floor of the exhaust passage that is provided by the partition and that slants upwardly from the outlet toward a forward end of the cover and a dam in the exhaust passage provided by the floor.

12. A vent assembly for attachment to the roof of a vehicle comprising;

a base having an inlet extending through a wall of the base, a cover attached to the base to form a vent housing, an outlet at the rear end of the cover, and a partition disposed in the housing to provide an exhaust passage from the inlet to the outlet, the partition providing an internal drainage system inhibiting water flow from the outlet back to the inlet comprising a floor of the exhaust passage that is provided by the partition and that slants upwardly from the outlet toward a forward end of the cover and a dam in the exhaust passage provided by the floor, wherein the exhaust passage comprises a longitudinal rib of the partition, wherein the vent assembly comprises a drain passage between the longitudinal rib of partition and a wall of the cover, and wherein the longitudinal rib has a cross passage connecting the exhaust passage to the drain passage, the cross passage being forward of the dam.

13. The vent assembly as defined in claim 12 wherein the dam has a forward edge and the cross passage is at the forward edge of the dam.

14. The vent assembly as defined in claim 13 wherein the exhaust passage has a second dam provided by the floor and a second cross passage connecting the exhaust passage to the drain passage, the second cross passage being forward of the second dam.

15. The vent assembly as defined in claim 14 wherein the second dam has a forward edge and the second cross passage is at the forward edge of the second dam.

16. A vent assembly for attachment to the roof of a vehicle comprising;

a base having an inlet extending through a wall of the base, a cover attached to the base to form a vent housing, an outlet at the rear end of the cover, and an exhaust passage in the housing leading from the inlet to the outlet, the cover having a dome, the dome having a forward nose, a rearward recess, and a drainage channel leading from the rearward recess to the nose to limit the level of any water accumulated in the recess.

17. The vent assembly as defined in claim 16 wherein the cover further comprises a boss in the recess that has an upper surface that is at least as high as the bottom of the drainage channel to prevent the accumulation of water in the recess and formation of ice on the upper surface of the boss.

18. The vent assembly as defined in claim 17 further including a handle disposed in the recess, the handle having a portion that extends through a hole in the upper surface of the boss that is disposed in the recess.

19. A vent assembly for attachment to the roof of a vehicle comprising;

a base having an inlet extending through a wall of the base, a cover attached to the base to form a vent housing, an outlet at the rear end of the cover, a partition disposed in the housing to provide an exhaust passage from the inlet to the outlet, the exhaust passage comprises a longitudinal rib of the partition, a drain passage between the longitudinal rib of the partition and a wall of the cover, and the longitudinal rib having a cross passage connecting the exhaust passage to the drain passage.

20. The vent assembly as defined in claim 19 wherein the exhaust passage has a floor that is provided by the partition and that slants upwardly from the outlet toward a forward end of the cover wherein the exhaust passage has a dam provided by the floor that is rearward of the cross passage.

* * * * *